(12) United States Patent
Renedo Puig et al.

(10) Patent No.: US 6,264,435 B1
(45) Date of Patent: Jul. 24, 2001

(54) REGULATION OF FLUID CONDITIONING STATIONS

(76) Inventors: Jordi Renedo Puig; Isabel Rouco Martinez, both of C. de la Verge dels Dolors, 23 08960 Sant Just Desvern (ES)

( * ) Notice: Subject to any disclaimer, the term of this patent is extended or adjusted under 35 U.S.C. 154(b) by 0 days.

(21) Appl. No.: 09/213,676

(22) Filed: Dec. 17, 1998

(30) Foreign Application Priority Data

Dec. 17, 1998 (ES) .................................................... 9702711

(51) Int. Cl.[7] .................................................. F04B 49/00
(52) U.S. Cl. ............................................. 417/286; 417/38
(58) Field of Search .............................. 417/26, 216, 286, 417/53, 8, 12, 63, 2, 38, 44.2; 165/31; 62/126; 318/101; 604/67; 222/1; 623/3

(56) References Cited

U.S. PATENT DOCUMENTS

| | | | |
|---|---|---|---|
| 3,692,430 | * 9/1972 | Timmons | 417/26 |
| 3,985,472 | * 10/1976 | Virtue et al. | 417/216 |
| 4,031,950 | * 6/1977 | Shultz | 165/31 |
| 4,259,038 | * 3/1981 | Jorgensen et al. | 417/53 |
| 4,561,261 | * 12/1985 | Kornrumpf et al. | 62/126 |
| 4,576,552 | * 3/1986 | Smith | 417/2 |
| 4,580,947 | * 4/1986 | Shibat et al. | 417/8 |
| 5,464,327 | * 11/1995 | Horwitz | 417/12 |
| 5,503,533 | * 4/1996 | Potter et al. | 417/63 |
| 5,707,211 | * 1/1998 | Kochan, Sr. | 417/38 |
| 5,789,879 | * 8/1998 | Cook | 318/101 |
| 5,803,917 | * 9/1998 | Butterfield et al. | 604/67 |
| 5,846,056 | * 12/1998 | Dhindsa et al. | 417/44.2 |
| 5,992,686 | * 11/1999 | Cline et al. | 222/1 |
| 6,048,363 | * 4/2000 | Nagyszalanczy et al. | 623/3 |

* cited by examiner

Primary Examiner—Teresa Walberg
Assistant Examiner—Leonld Fastovsky
(74) Attorney, Agent, or Firm—Steinberg & Raskin, P.C.

(57) ABSTRACT

They are characterized in that, when the pressure at the measurement point reaches or exceeds the start-up pressure value and/or when the flow provided by the pumping devices is lower than the consumption flow, the flow provided by the station increases by a step, and, when the pressure at the measuring point reaches the stop pressure value and/or when the flow provided by the pumping devices exceeds the consumption flow, the flow provided by the station reduces by a step. According to another embodiment, a pumping device stops or remains in operation without pumping ("stand by") when said pumping device is in operating conditions such that there could be a reduction of life of the pumping device or overheating of same. Significant energy saving and longer useful life of pumping devices is achieved.

19 Claims, 9 Drawing Sheets

REGULATION OF FLUID CONDITIONING STATIONS

The present invention relates to improvements in the regulation of fluid conditioning stations which include a plurality of pumping devices, at least one fluid accumulator container, at least one pressure transducer and regulating means, the conditioning station providing a fluid at a certain pressure and flow for consumption, the pumping devices starting and stopping so that the pressure at the measuring point is maintained between two pressure-limit values called start pressure, which is determined in function of a limiting value to be maintained, and stop pressure.

The term "pumping device" is used in this specification both to designate the devices which work with positive pressure, such as compressors, and to designate devices which work with negative pressure, for example "vacuum pumps".

The term "hysteresis" is used to designate an interval between two pressures, for example between the start pressure and the stop pressure of a pumping device.

In this specification the term "fluid conditioning stations" is used particularly, though not exclusively, to designate both compressor stations which work at constant intake pressure and variable output pressure, and the so-called vacuum stations, which normally work under a regime of variable intake pressure and constant outlet pressure.

The conditioning stations have the function of transmitting power by conditioning the variables, such as pressure and flow.

The invention also relates to improvements in the regulation of stations which condition other variables such as temperature and flow of a fluid, such as water or thermal oil.

BACKGROUND OF THE INVENTION

Traditionally, in fluid conditioning stations the pumping devices are started and stopped in such a way that the pressure in the fluid accumulating container(s) is kept between two pressure limiting values, called start pressure, which is determined in function of minimum values to be maintained, and stop pressure which is determined in function of the maximum recommendable number of starts per unit of time of the pumping devices.

Said stations presented the disadvantage of not adapting well to consumption, which is random and can vary across wide values. One example of variable consumption is to be found in hospitals, in which consumption is maximum in the mornings of working days (due to an increase in operating and resuscitation theatres in use) and minimum on Saturdays and Sundays and particularly in the month of August. The ratio between maximum consumption and minimum consumption can easily be 5 to 1.

In these cases, the starting and stopping of the pumping devices took no account at all of the possibility of adapting the station to consumption, so that, for example, a high-power pumping device could be started up for a small consumption flow.

This system involved a considerable squandering of energy and high wear of pumping devices, which resulted in shorter pump life.

Moreover, the flow supplied by the station was not suitably controlled, since the most suitable combination of pumping devices was not always in operation.

Spanish patent application P9300399 by the same applicants suggested several solutions for the aforesaid problems.

Essentially, said application is characterized in that only one pumping device is put into operation when the pressure in the fluid accumulator containers reaches or exceeds the start pressure value and/or when the flow provided by the pumping devices which are operating is lower than the consumption flow; and only one pumping device stops when the pressure in the fluid accumulator containers reaches the stop pressure value and/or when the flow provided by the pumping devices which are operating exceeds the consumption flow.

This feature allowed a stepped increase of the flow provided by the station to be ensured, in as many steps as there were pumping devices making up peak flow at the station in question, together with progressive adaptation to changing consumption.

The aforesaid patent application also suggests other possibilities for controlling stopping of the pumping devices by means of conditions such as a number of starts/stops per unit of time, or by fixing a cycle during which there can be no stoppage. Also suggested as an alternative to stopping a pumping device which can operate without pumping ("stand by").

DESCRIPTION OF THE INVENTION

The present invention manages to improve the energy saving of the station and also to improve the operating conditions of the pumping devices.

According to one embodiment, when the start pressure is determined in function of a limiting value to be maintained, the improvements of the invention in the regulation of fluid conditioning stations are characterized in that when the pressure at the measuring point reaches or exceeds the start pressure value and/or when the flow provided by the pumping devices which are in operation is less than the consumption flow, the flow provided by the station increases by one step, and when the pressure at the measuring point reaches the stop pressure value and/or when the flow provided by the pumping devices which are in operation exceeds the consumption flow, the flow provided by the station reduces by one step.

In this description, "step" is taken to mean the flow of one pumping device of a station or the difference of flows between two sets of pumping devices of a station.

The steps are thus not limited to a single pumping device, so that improved energy saving is achieved.

Advantageously, when one pumping device stops and another starts up in the sense of increasing the total capacity of the station (where there exist at least two different flow rates from pumps), stoppage of the first does not take place until the set of pumping devices has reached or exceeded the start value by a certain percentage. The response speed is thus increased, which means that the time during which the pressure is below the start value is reduced.

The regulation of fluid conditioning stations can also be improved if the pressure measuring point(s) are situated at the ends of the various consumption lines, or if the pressure measuring point(s) are situated at a point between the consumption points and the filters of the fluid conditioning station, taking in both cases the signal(s) from the most unfavourable measuring points or a combination of measuring points.

The usefulness of these solutions becomes clearer if they are compared with the conventional solution.

If a hospital vacuum station takes as a starting parameter a necessary pressure of −400 mm Hg at the end of the line, and the most unfavourable case is taken to be a pressure loss in filters (maximum dirtiness at nominal flow) and line (maximum loss at nominal flow) of 50 mm Hg, and if on the other hand the real pressure loss is 10 mm Hg at each position, then the following values would obtain:

In the conventional case, in which the pressure measuring points are in the station, the start pressure would be 500 mm Hg and the real pressure at the end of the line 480 mm Hg, since 480=500−10−10.

According to a first embodiment of the invention, in which the pressure measuring points are at the ends of the various lines, the start pressure would be 420 mm Hg at the station, since 420=400+10+10, and the real pressure at the end of the line 400 mm Hg, which is the preselected pressure.

According to a second embodiment, in which the pressure measuring points are at a point which is between the consumption points and the filters of the station, the start pressure would be 460 mm Hg at the station, since 460=450+10, and the real pressure at the end of the line 440 mm Hg, since 440=450−10.

From this it can be deduced that the closer the pressure measuring points are to the consumption points the greater will be the energy saving.

In the two embodiments described, in which the sensors are situated at a certain distance from the station, the start pressure depends upon the measuring point, so that adjustments could be considered to be floating, that is, they depend upon the position and are up to a point independent of losses of head in the line and in the filters.

Another improvement consists in the stop value not being constant for all the pumping devices, it being possible for there to be as many stop values as there are steps making up the station, so that stoppage occurs for lower values than a conventional stop value which would be possible for all the pumping devices. The different stop values for each step can be decreasing as the flow increases. A major energy saving is achieved thereby.

Another improvement consists in a certain additional hysteresis being provided for the critical points defined as the vacuum values reached (at constant consumption flow) after the start value is reached and a further step is entered.

The arrangement thereby avoids the start/stop oscillations of pumping devices for very small variations in the consumption flow in zones adjacent to the critical points.

The hysteresis can be expressed in pressure-measurement units, in flow units or as a percentage of any of the foregoing measurements.

According to another embodiment, when the start pressure is also determined in function of a limiting value to be maintained, and the stop pressure is determined in function of the number of starts per unit of time of the pumping devices, the improvements are characterized in that a pumping device stops or remains in operation without pumping ("stand by") when the aforesaid pumping device is in operating conditions which may give rise to a reduction in the life of the pumping device or lead to overheating of same.

This is a dynamic limitation system which allows the life of the pumping device to be extended.

More particularly, the operating conditions which can give rise to a reduction of the life of the pumping device or overheating of same are defined in function of influencing factors such as the height above sea level, the power dissipated by the motor of the pumping device, the suction pressure at the time, ambient temperature, electrical overloads due to starts and the heat accumulation capacity of the pumping device.

Advantageously, in the non-pumping (stand by) mode of operation it is possible to work with lower stop values than those required for ON-OFF operation.

Automatic determination will be provided by calculation of the consumption flow and of maximum calculated frequency of ON-OFF operation, and/or exceeding of the preset values of the dynamic limiter in any of its modalities, in addition to provision of suitable auxiliary devices such as, in the case of vacuum devices, a closing element which cuts off suction if the pumps are of the vane type.

The preceding paragraph describes how to pass from the classic ON-OFF system to the mixed ON-STAND BY system. The inverse path is identical, and would allow for changeover from STANDBY to ON-OFF where it is expected that the station will be able to work within the limits established by calculation of the consumption flow and determination of the maximum ON-OFF frequency. A periodic testing alternative would also be possible.

The overall frequency of several equal pumping devices can also be replaced by a single device operating in ON-STAND BY mode. Calculation of the consumption flow is carried out on the basis of the following influencing factors: the flow of the pumping devices in operation, the time it takes to pass from one pressure value to another and the available storage capacities.

Although operation with lower stop values is already known, determination of the path for changeover from the classic on-off system (or from the on-off system with multiple stop values) to the modulating stand by system, and vice versa, is not known.

Working with lower stop values permits working with lower than usual hysteresis values, providing a more stable service in terms of pressure or vacuum, though at greater energy consumption cost.

Stations will operate with an ON-OFF or ON-STAND BY system as wished or in accordance with the local conditions of the facility and consumption flow calculations and consequent determination of the maximum operational frequency in ON-OFF mode, as outlined above.

Advantageously, when the pressure at the measuring point reaches the stop pressure value, stoppage of the pumping device only occurs if a preset time has elapsed, which is variable according to the influencing factors, since the last stoppage of the pumping device. Otherwise, it will continue to operate normally or without pumping (stand by).

This embodiment pertains to a system of dynamic limitation per cycle.

Also advantageously, when the pressure at the measuring point reaches the stop pressure value, stoppage of the pumping device occurs only if a certain preset number of starts per unit of time has not been exceeded, the number of starts varying in accordance with the influencing factors. Otherwise, it will continue to operate normally or without pumping (stand by) until the above situation is reached.

This embodiment pertains to a system of dynamic limitation by unit of time, such as per hour. This period of time corresponds to the last 60 minutes, that is, it ends at the current time, so mechanisms have to be provided for updating the number of starts per unit of time.

According to another embodiment, the improvements are characterized in that when the pressure at the measuring point reaches the stop pressure value, stoppage of the pumping device occurs only if two conditions obtain: a preset time, variable in accordance with the influencing factors, has elapsed since the last stoppage of the pumping device; or a certain preset number of starts per unit of time has not been exceeded, this being variable in accordance with the influencing factors. One criterion or the other will act in function of a predetermined proportion between the number of starts to which the pumping device is subjected and a certain preset number of starts per unit of time, variable in accordance with the influencing factors, with one or the other criterion taking effect in function of a predetermined proportion between the number of starts to which the pumping device is subjected and the preset number of starts per unit of time. Otherwise, it continues to operate normally or without pumping (stand by).

This system pertains to a mixed dynamic limitation system, that is, per cycle and per unit of time. It combines the advantages of both systems, while notably reducing the disadvantages.

According to another embodiment, when the pressure at the measuring point reaches the stop pressure value stoppage of the pumping device or its operation without pumping only takes place if the calculated value of the accumulated heat in the pumping device exceeds a preset value which varies in accordance with the influencing factors. Otherwise, it will continue to operate normally or without pumping (standby).

This is a thermal-type dynamic limitation system.

Although dynamic limitation by cycle is very easy to implement and very precise on the basis of timing since the last stoppage, it is also possible to implement an approximately equivalent function from the start time by assuming that the operating conditions will vary little from one cycle to another.

When the consumption flow, storage volumes, atmospheric pressure, flow of operating pumps and time necessary for the pressure to move from the start value to the stop value or other value are known, the cycle (idle time) is calculated. The more stable the consumption flow the more precise this result will be.

According to another embodiment of the invention, the improvements consist in carrying out work on the station or on the installation (such as oil changes, draining and duration of an adsorption cycle) in proportion with influencing parameters of the station fluids (such as pressure, temperature and volume) at their various stages, and indraught influencing parameters (such as pressure, relative humidity and temperature).

At vacuum stations, for example, oil changes can be carried out in function of the ambient or standardized volume which has circulated or otherwise, solely and exclusively in function of operating hours. It must be taken into account that the standardized volume (in terms of pressure and temperature) is very different from the geometric volume of the pumps, and depends upon start-stop adjustments. For a given number of operating hours of a single station, with the same adjustments according to whether it has been working for a longer time closer to the start or stop values, the standardized $m^3$ (for example, at 15° C. and 760 mm Hg) can vary considerably.

Action on the basis of volume is much more appropriate, since dirtiness is proportional to the total volume handled or, in other words, kilograms of air passed through.

At stations using air at pressures higher than atmospheric pressure, condensates can be drained off in function of one or more indraught parameters (volume introduced, temperature and relative humidity) and one or more of the treatment parameters, especially pressure and temperature.

The indraught conditions determine or set values on the quantity of intake air and the treatment conditions determine or set values on the condensation in each section (rear cooler, rear refrigerator cooler, filters, etc.) of the treatment.

Setting parameters for the quantity of condensate produced in each phase, even if only approximately, allows the number of bleeding operations to be adjusted to objective factors so as to prevent wastage (of air) in bleeding operations timed to take place at regular intervals. It is usual, for example, to program the bleed valve to open for 5 seconds every half hour, during which time compressed air is released to the exterior together with the condensate, so that over a lengthy period a considerable volume of compressed air (and therefore of energy) is lost.

In general terms, work at the station can consist in carrying out a bleeding operation when the quantity of condensate is calculated to have reached the maximum amount planned, said maximum value being calculated on the basis of the influencing factors mentioned above.

There is generally a pressurized container at the bleeding point, where the condensate enters by gravity or by the pressure of the circuit itself.

According to one particular embodiment, the receptacle is a pressurized container placed beneath the main receptacle or point to be bled and with a closing device at the inlet and another at the outlet. The closing devices can be, for example, electrically operated valves, for which reason reference will be made to same below, although it is clear that other devices could be used.

The inlet valve is normally open, so the condensate enters the secondary receptacle by gravity. When by calculation a certain percentage of the maximum capacity is reached, the inlet valve closes. After a certain time has elapsed (to ensure closure) the outlet valve opens. Given that the container was not totally full of liquid, the pressure of the air-filled space pushes the condensate. No further air can be lost other than that corresponding to the space not filled with condensate.

A great advantage is thus obtained over timed systems, since the latter must be programmed for the hours of maximum consumption (maximum condensate) and the opening time is difficult to set. A considerable amount of air escapes during periods of low consumption.

The system proposed bleeds only proportionally to production and, unlike the traditional system, does not bleed where there is no production or very little production. As in this case the practical difference between production and consumption is very small, both terms can be interchanged without great errors.

One variant consists in fitting an electrically operated inlet valve from a primary container and a float bleed valve at the outlet. In this case, the electrically operated inlet valve is normally closed, opening with the said proportionality criteria for such time as is considered necessary for bleeding, in the knowledge that leakage from the bleed valve is very small over short periods of time.

The probability of liquids entering the vacuum networks is proportional to the normal volume bled off, so that proportional bleeding will be much more effective than bleeding at fixed intervals.

Another variant consists in a bleeder at the inlet and an electrically operated valve at the outlet. This electrically operated valve is normally closed, opening only when the primary tank is calculated to reach a certain level for sufficient time for draining, taking into account that leakage from the bleed valve is very small over very short periods of time.

In any of the above embodiments, if instantaneous flows of condensate are very considerable it may be necessary to fit a pressure-equalizing pipe (between the gas phases from the secondary and primary containers), so that any overpressures which might arise in the second container do not prevent suitable drainage. This pipe should also be provided with the corresponding closing device.

Finally, for air-regenerated adsorption dryers account must taken of the fact that their adsorption capacity depends on circulating volume and its temperature, pressure and humidity. More particularly, the action of the station consists in both the working time and the regeneration time of each tower being variable in accordance with one or more of the aforesaid influencing factors, such as on the one hand the ambient pressure (measured or estimated), the temperature (measured or estimated) and the ambient hygrometric degree (measured or estimated) and the flow circulating (measured or estimated), and on the other hand the internal influencing variables such as pressure (measured or estimated), temperature (measured or estimated) and hygrometric degree (measured or estimated). Action on the station has the basic objective of maintaining an approximately constant dew point, despite variations in the influencing factors.

All this provides significant energy saving (in the case of positive pressure stations) of the order of 15 to 25% or more of the compressor motor power, due to dryer compressor uncoupling, to the aforesaid variables and to the sections of lower consumption than rated consumption.

BRIEF DESCRIPTION OF THE DRAWINGS

For a better understanding of all that has been outlined some drawings are attached in which, schematically and solely by way of non-restrictive example, some practical cases of embodiment are shown.

In said drawings.

DESCRIPTION OF PREFERRED EMBODIMENTS

Figure 1:
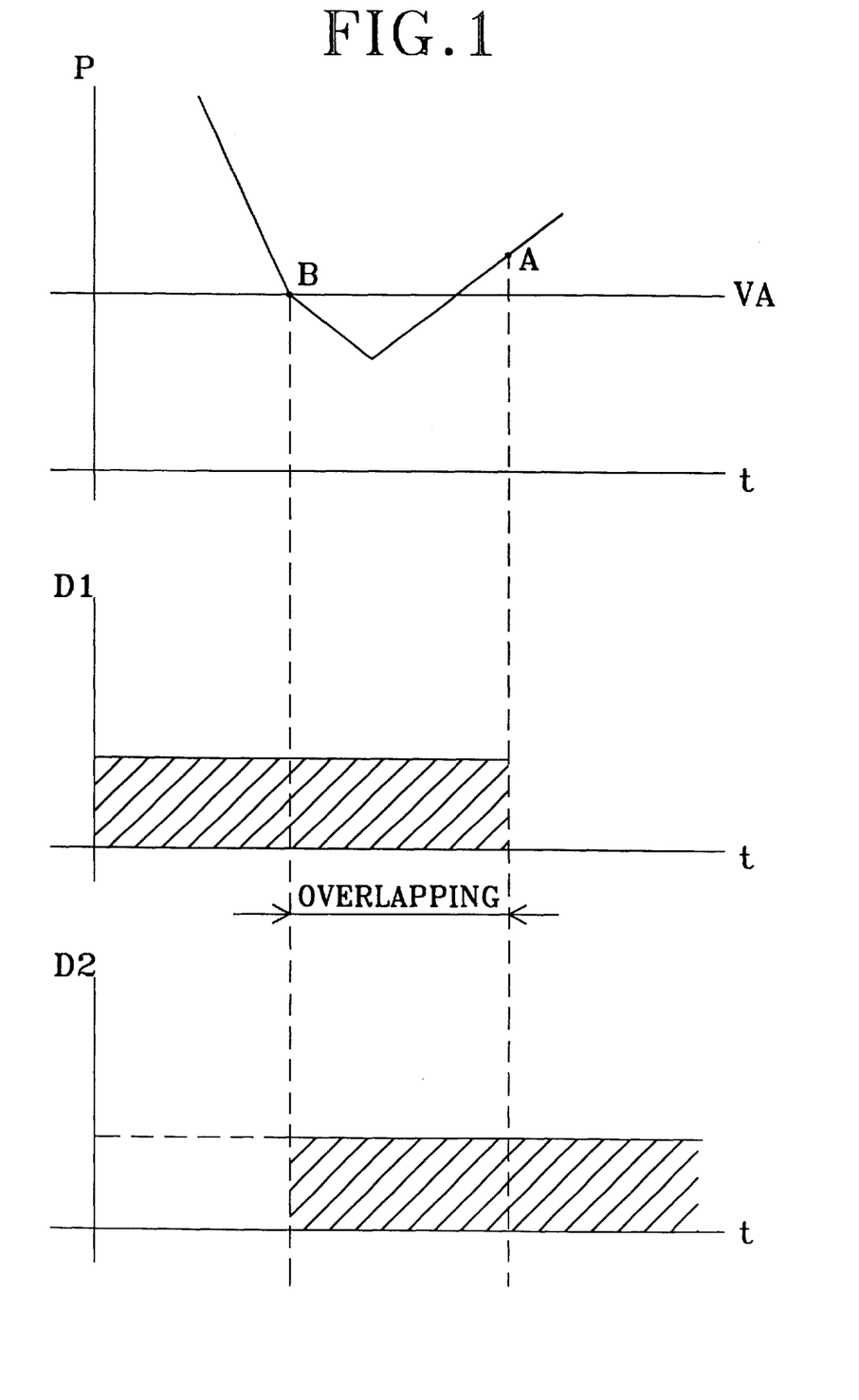
FIG. 1 is a flow/pressure diagram showing the start/stop overlapping.

The upper part of FIG. 1 shows the flow/pressure curve and its evolution when there are two pumping devices D1 and D2.

When one pumping device D1 is to be stopped and another D2 started in the sense of increasing the total capacity of the station (where there are at least two different pump flows), stoppage of the first D1 does not occur until point A, when the pressure of the pumping devices has exceeded the start value VA.

Starting of the pumping device D2 takes place when the pressure is at the start value (point B), which means that for a certain time both pumping devices are working simultaneously, that is, there is overlapping of the two devices.

The response speed is increased thereby, that is, the time during which the pressure is below the start value is decreased, since during the overlapping both pumping devices are in operation.

Figure 2:
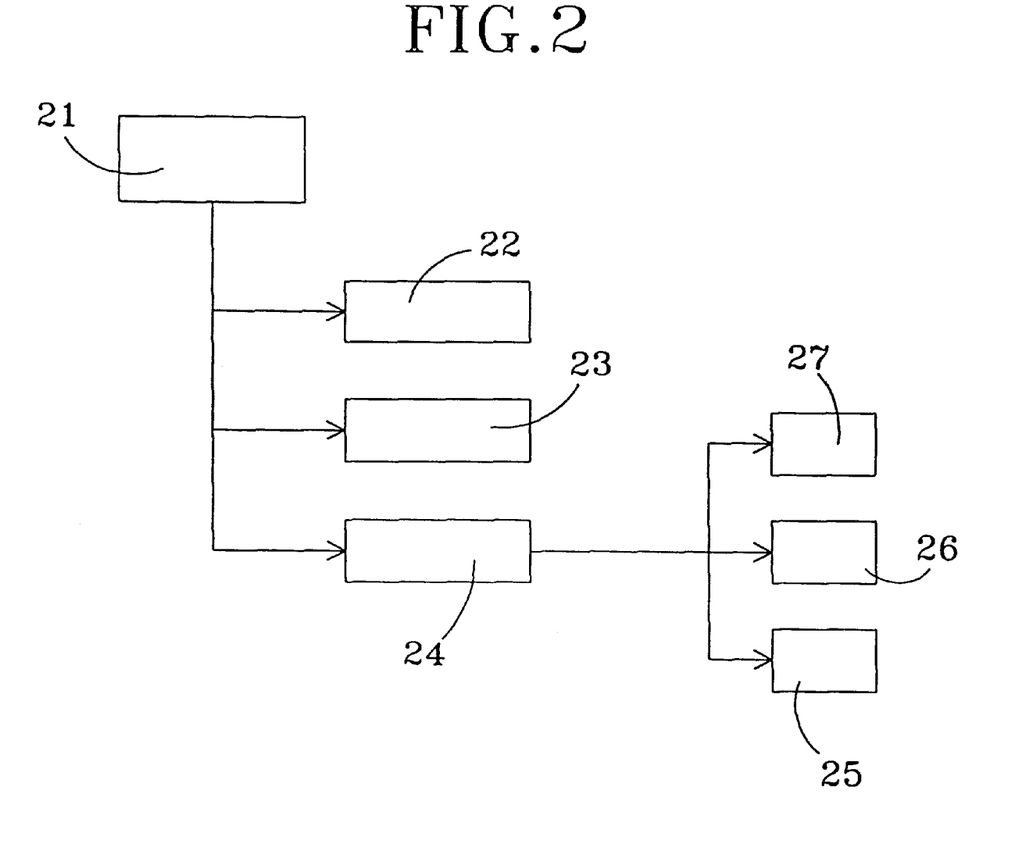
FIG. 2 is a diagram showing the arrangement of the pressure sensors in various positions of the line.

FIG. 2 shows the different positions in which the pressure sensors can be arranged.

The pressure measuring points (block 21) can be situated at different points of the circuit: in the drum (block 22), before the filters (block 23) or at the end of the line (block 24). In this last case, several points can be allowed for (blocks 25, 26 and 27).

As stated above, if in a hospital vacuum system the starting point is a necessary end-of-line pressure of −400 Hg and the most unfavourable hypothesis is taken to be a pressure loss in both filters (maximum dirtiness at rated flow) and in the line (maximum loss at rated flow) of 50 mm of Hg, and on the other hand at any given time the real pressure loss is 10 mm Hg in each position, the conventional system, that is, at the drum (block 22), would give a starting pressure of 500 mm Hg, with the sensors situated before the filters (block 23) a starting pressure of 460 mm Hg, and with the sensors situated at the end of the line a starting pressure of 420 mm Hg.

That is, the closer the pressure measuring points are to the consumption points the greater is the energy saving.

Figure 3:
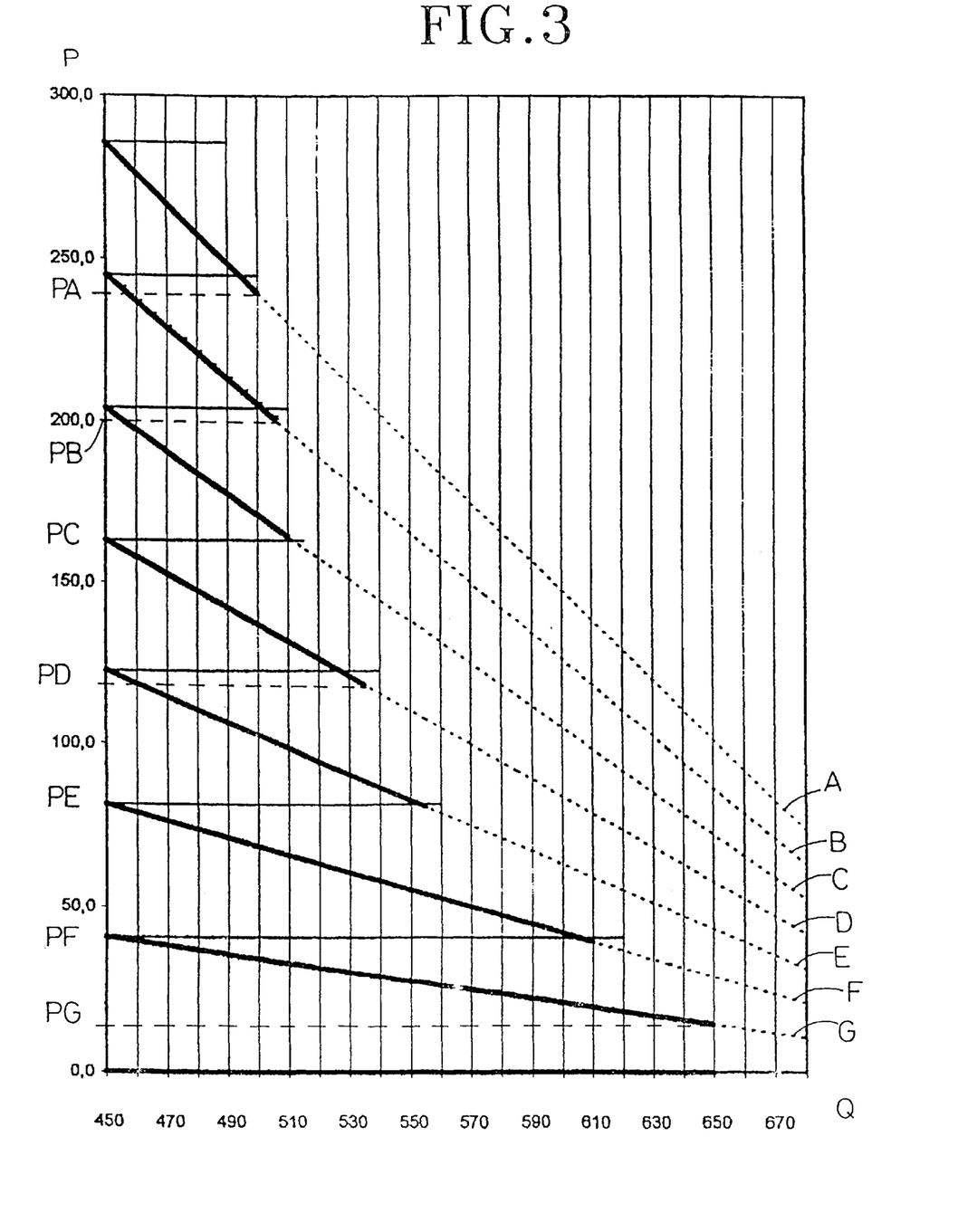
FIG. 3 is a flow/pressure diagram showing the response of a pumping-devices station with numerous stop values.

The diagram of FIG. 3 shows the response of a pumping device station with multiple stop values.

The Figure shows a plurality of straight lines A, B, C, D, E, F, G, which correspond to a plurality of stations. As can be seen, the stop values PA, PB, PC, PD, PE, PF, PG, are different for each step and decrease as flow increases. A significant saving of energy is achieved thereby.

Figure 4:
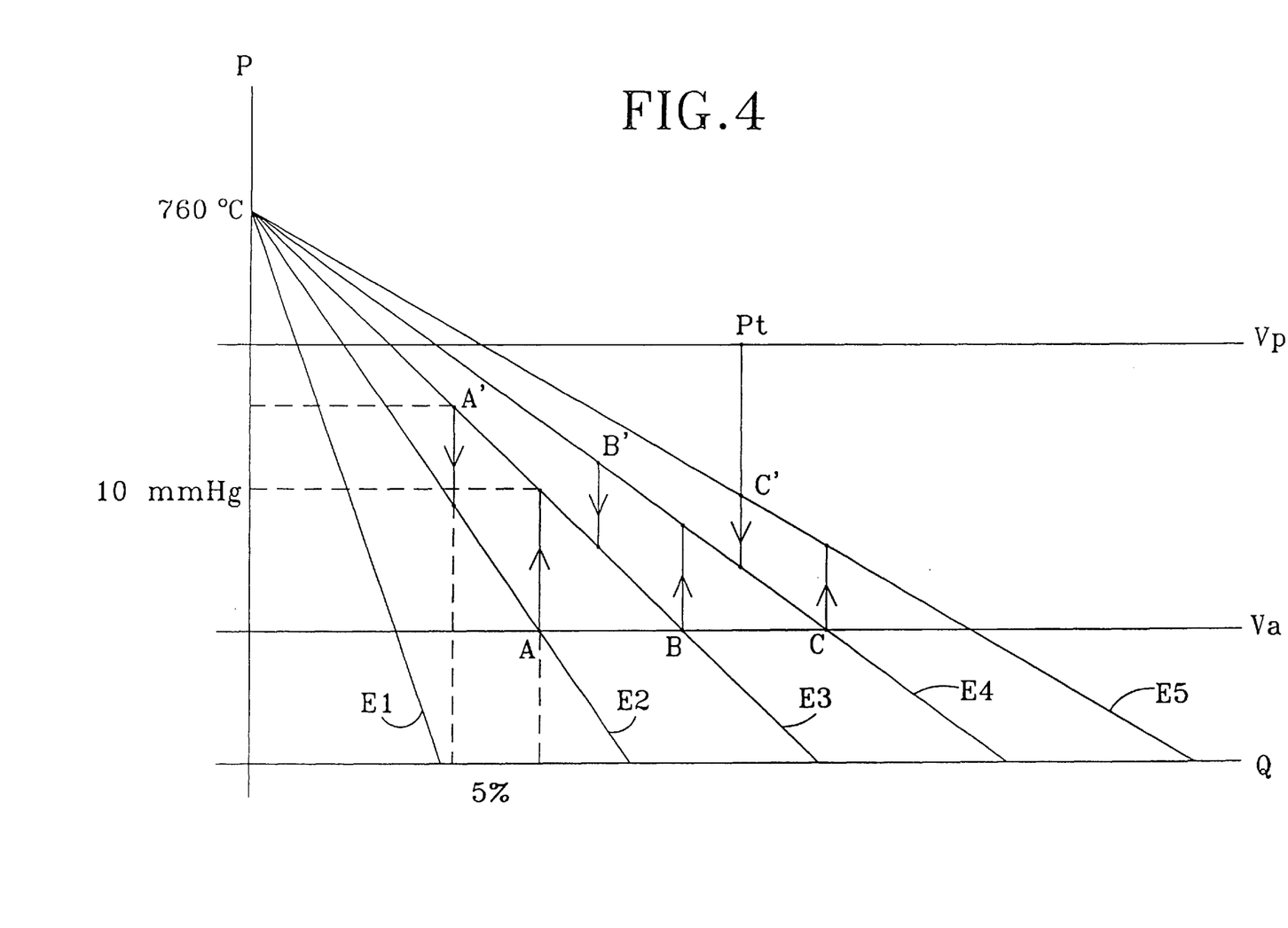
FIG. 4 is a flow/pressure diagram showing the additional hysteresis at the critical points.

FIG. 4 shows the operation of a fluid conditioning station, with the flow Q shown on the abscissa and the pressure p on the ordinate axis. The various flow steps due to connecting and disconnecting different pumping devices are shown.

In the vicinity of the critical points A, B, C, if these points are taken as stop adjustments, there is a risk of small consumption oscillations causing a pumping device to stop and start continuously. The critical points are defined as the vacuum values reached (at constant consumption flow) after the start value Va is reached and a new step is entered. For example, the critical point A is reached after the start value Va has been reached and the new step E2 entered.

In order to avoid or minimize this succession of starts and stops, the stop values occur displaced from the theoretical value by a certain value, which is tantamount to saying that a certain hysteresis must be introduced. In the figure, the new stop values would be A', B' and C'.

This hysteresis can be expressed in units of vacuum to be added to the stop value, for example 10 mm Hg in the figure, or in units of flow, for example 5 m$^3$/h of pumping.

It can also be expressed as a percentage of the stop vacuum as critical point or as a percentage of the flow corresponding to the stop vacuum as critical point.

FIG. 3 shows other examples of critical points. Points PA, PB and PD, in particular, show the extra hystereses for solving the critical points.

The energy saving can be evaluated on the basis of the pressure difference between the real stop pressure and the theoretical stop pressure defined by the line Vp. In particular, for stop pressure C' the segment C' Pt is the aforesaid pressure difference.

Figure 5:
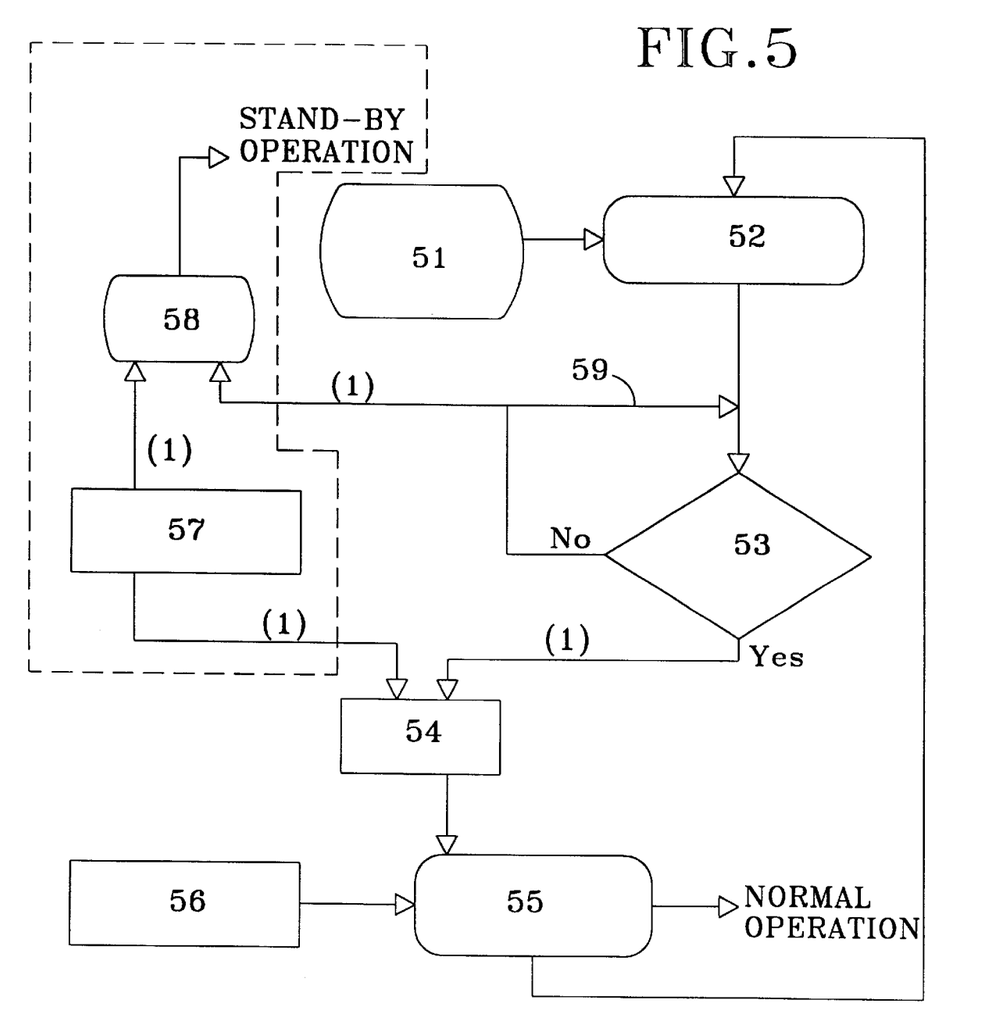
FIG. 5 is a diagram relating to a system of dynamic limitation per cycle.

FIG. 5 relates to a system of dynamic limitation by cycle.

In this case, the stop pressure is determined in function of the number of starts per unit of time of the pumping devices and a pumping device stops or remains in operation without pumping (stand by) when the aforesaid pumping device is under operating conditions such as may lead to reduced working life of the pumping device or overheating of same.

The operating conditions which can give rise to reduced working life of the pumping device or overheating of same are defined in function of influencing factors such as height above sea level, the power dissipated by the motor of the pumping device, ambient temperature, electrical overloads due to starts and the heat accumulation capacity of the pumping device.

FIG. 5 shows that two different results, namely normal operation and stand by operation, can be produced according to the prevailing conditions.

Block 52 corresponds to the minimum cycle timing and block 51 relates to the influencing factors. The minimum cycle is variable in function of said influencing factors, that is, these factors are taken into account in defining the cycle.

Block 53 corresponds to a query as to whether or not the cycle has ended.

If the cycle has ended there is a signal (1) at the input of the logic gate corresponding to block 54; if the cycle has not ended, a new query cycle begins, as can be seen at arrow 59, while at the same time there is a signal (1) at the input of the AND logic gate pertaining to block 58.

When the stop order 57 arrives, if timing has not finished (query 59) there are two signals (1) at the input of the AND logic gate 58, so that operation will be in stand by mode.

This function is not always available. Operation in stand by is not usual in vacuum pumps, though it is usual in compressors, especially medium- and high-power ones.

Where there is a stop order 57 and the timing of the cycle 53 has finished, there is one signal (1) at the output of the AND gate 54, so that the memory is set to zero for normal operation.

In a simpler variant, the stand by function can be omitted.

Figure 6:
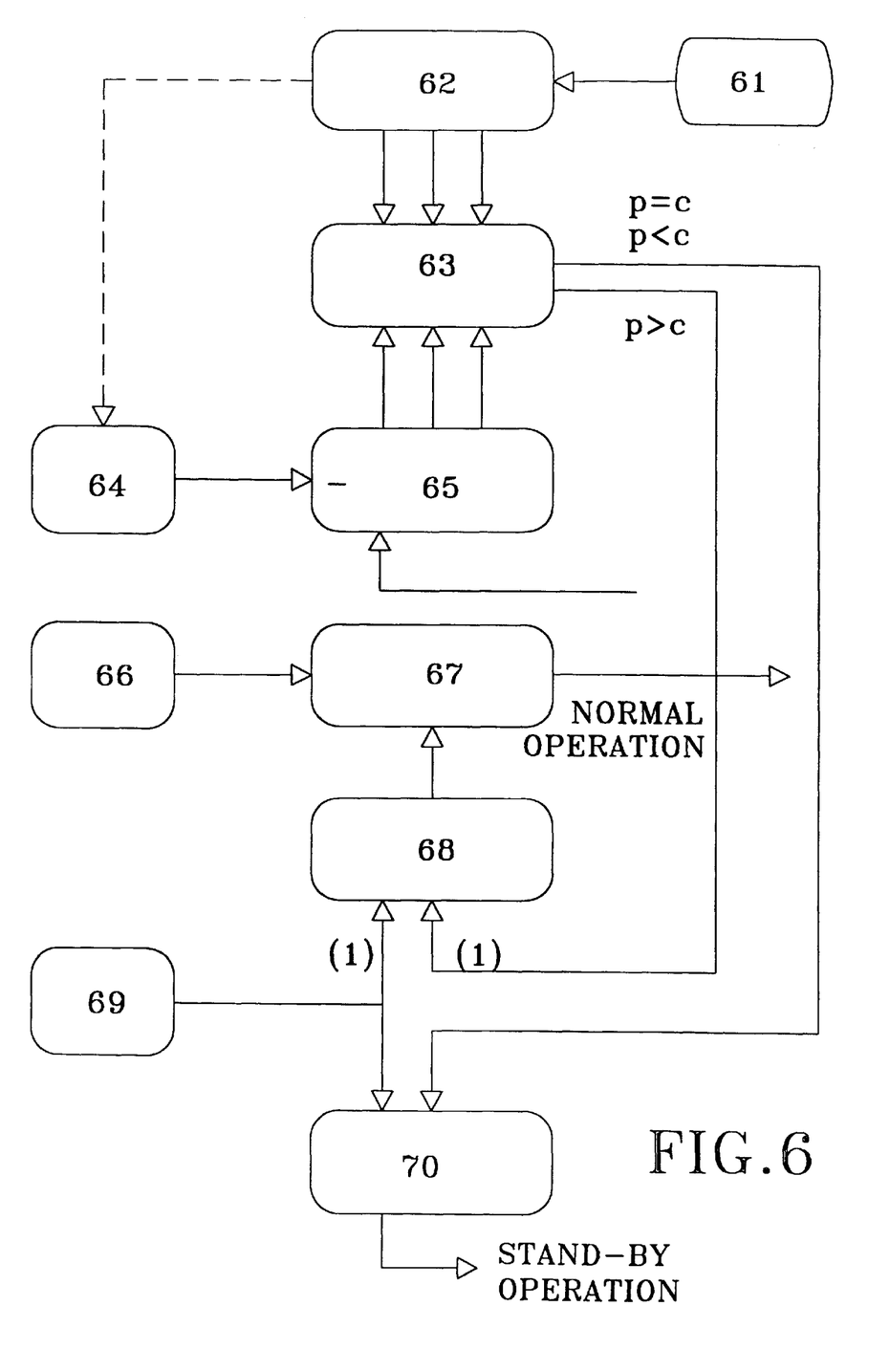
FIG. 6 is a diagram relating to a system of dynamic limitation per unit of time.

Like FIG. 5, FIG. 6 provides two different results: normal operation and operation in stand by, according to the prevailing conditions.

Block 62 corresponds to presetting of the number of starts per unit of time (for example, per hour). In this case, too, the number of starts per hour is preselected by taking account of the influencing factors shown in block 61.

Block 63 corresponds to a comparator on which the number of stoppages per unit of time counted on the counter corresponding to block 65 is compared with the number of starts per unit of time corresponding to block 62.

Block 64 corresponds to a time base, such as a pulse generator. Each pulse subtracts one unit, which is indicated with the sign (−) on block 65, and each stop adds one unit, which is indicated with the sign (+) in block 65.

If the preselected number of starts is higher than the number of stops counted (P>C), there is one signal (1) at the input of logic gate 68, which shows that there is permission for stoppage since it is combined with the stop signal (1) corresponding to block 69.

If, on the other hand, the preselected number of starts is the same as or less than the the number of stops counted (P=C or P<C), there is one signal (1) at the input of logic gate 70, which shows that there is permission for operation in stand by, since it is combined with the stop signal corresponding to block 69.

It must be taken into account that the values preselected on block 62 determine the pulses on the time base 64. For example, if the preselected value is 10 starts/hour, then block 64 would have one pulse every 6 minutes. Another additional feature consists in that, thanks to a device not shown, the counter for block 65 cannot count negative numbers and remains locked at zero.

Finally, the signal from logic gate 68 deletes (resets) the memory 67 which receives the memorization signal from block 66. The start and stop signals through the memory 67 thus determine normal running or operation.

Figure 7:
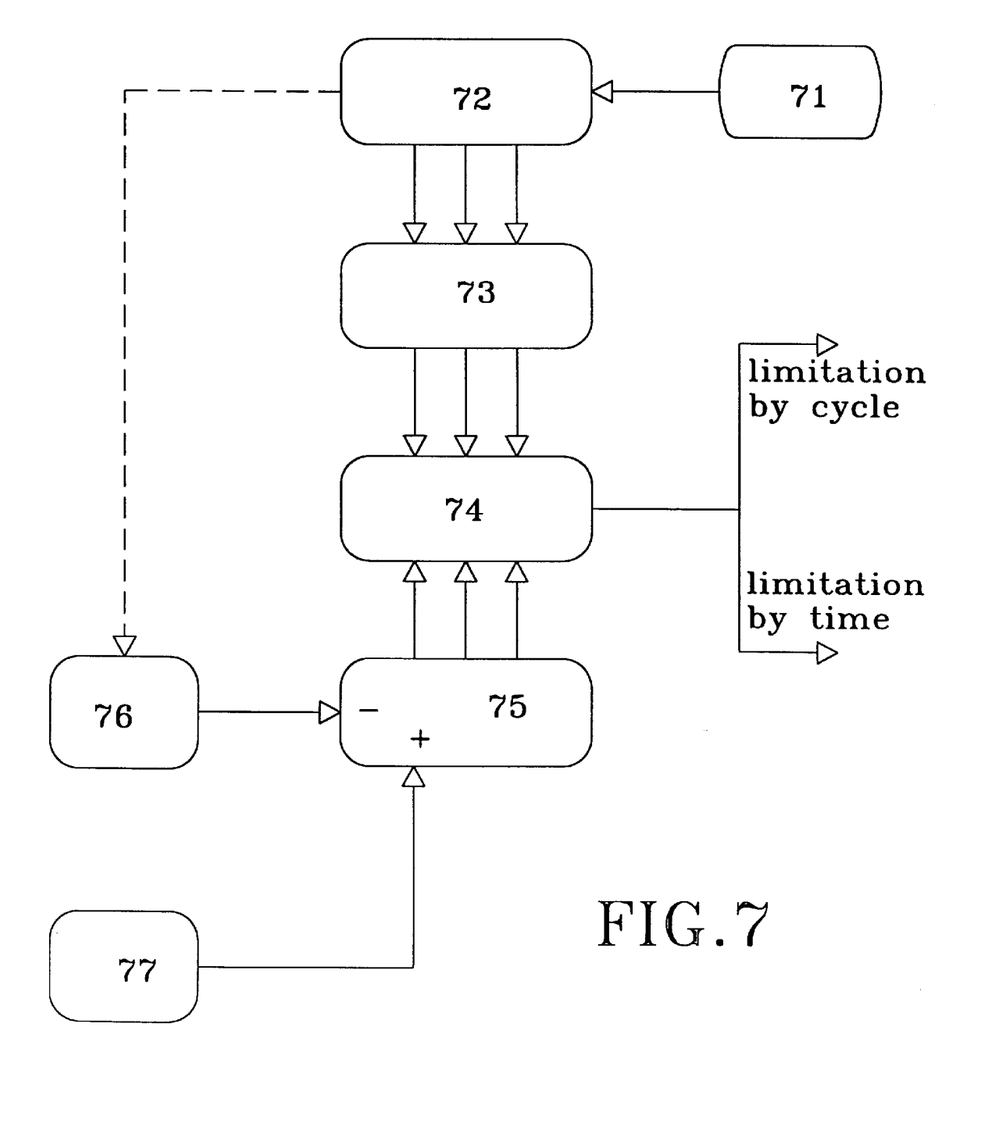
FIG. 7 is a diagram relating to a system of mixed dynamic limitation.

FIG. 7 corresponds to a mixed system of dynamic limitation which can be interpreted as a combination of the systems shown in FIGS. 5 and 6. It presents blocks common with the system of FIG. 2.

In FIG. 7, block 71 represents the influencing factors, block 72 preselection of the number of cycles per unit of time, block 74 represents the comparator and block 75 the counter. The counter 75 operates in a similar way on the basis of the time base 76, so that each pulse subtracts one unit from the counter and on the basis of the real stoppages, shown by block 77, so that each stoppage adds one unit to the counter.

It should further be borne in mind that the values preselected on block 72 determine the pulses on the times base 76. For example, if the preselected value is 10 starts/hour, then there would be one pulse every 6 minutes at block 76. Another additional feature consists in that, thanks to a device not shown, block 75 cannot count negative numbers and remains blocked at zero.

Block 73 is different and is the one which shows mixed operation, for this is the block with the percentage of maximum number of cycles per unit of time.

According to the number of starts per unit of time, two different results are obtained: limitation by cycle or limitation by hours.

An example may permit a better understanding of this system.

If the starting point is, for example, preselection of 10 per hour (block 72) as the number of cycles per unit of time and there is a preselected percentage of 50% (block 73), then the number of starts per reference hour at the comparator (block 74) will be 5.

If the counter (block 75) provides the comparator with, for example, 5 cycles per hour, then due to this being equal to the reference value there will be limitation by cycle.

If, on the other hand, the counter (block 75) provides the comparator with, for example, 2 cycles per hour, then due to this being less than the reference value there will be limitation by time.

Figure 8:
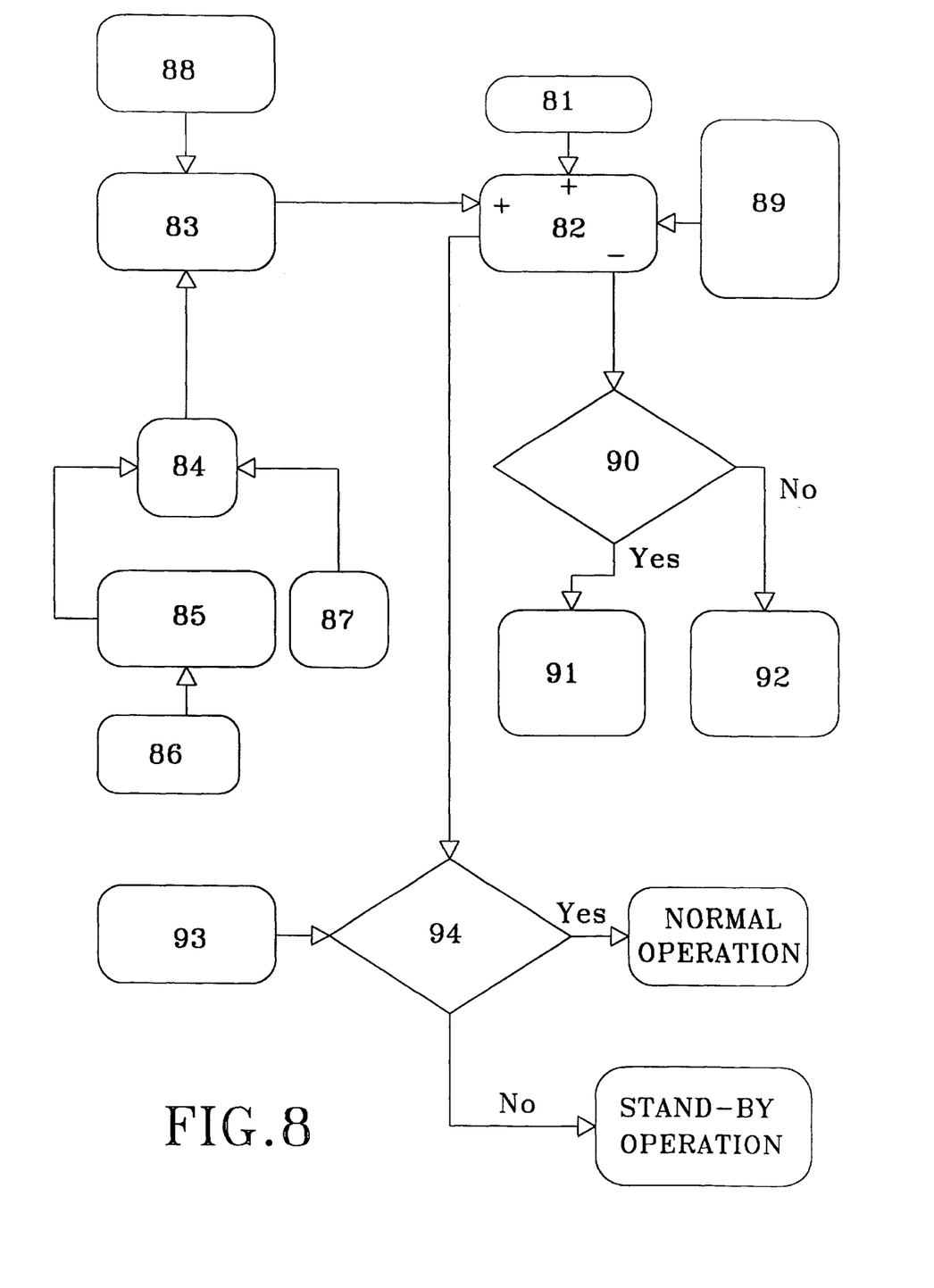
FIG. 8 is a diagram relating to a thermal-type system of dynamic limitation.

FIG. 8 relates to a system of dynamic limitation of the thermal type based on evaluation of the temperature of the motor which drives the pumping device, based on the difference between heat contribution and removal.

Contributions of heat ordered from greater to lesser are as follows:

starts (block 81);

vacuum or pressure level (block 86) combined with the pressure/power curves data (block 85); on the basis of these and of the pumping operation (block 87) data, the result at the logic gate of block 84 is obtained. Heat is contributed only while there is operation with pumping (block 87, logic 1);

contribution by operation in stand by on the basis of experimental or manufacturer data (block 88);

All these factors involve a contribution of heat (block 83) which is represented by the (+) sign at block 82, which represents thermal accumulation. The starts (block 81) also provide heat.

The removal of heat is also due to various factors:
if the pumping device is not operating (NO reply to the block 90 query), natural cooling takes place during the stoppage times, corresponding to block 92.

If the pumping device is operating (YES reply), then cooling is forced (block 91).

All these factors involve a removal of heat, for which reason they are shown by the (−) sign at block 82.

Other influencing factors such as ambient temperature, altitude, etc. (block 89) must also be taken into account.

Finally, normal or stand by operation depend upon the YES or NO response at block 94, at which it is queried whether the preselected temperature (block 93) is equal to or greater than that calculated as a result of thermal accumulation (block 82).

Figure 9:
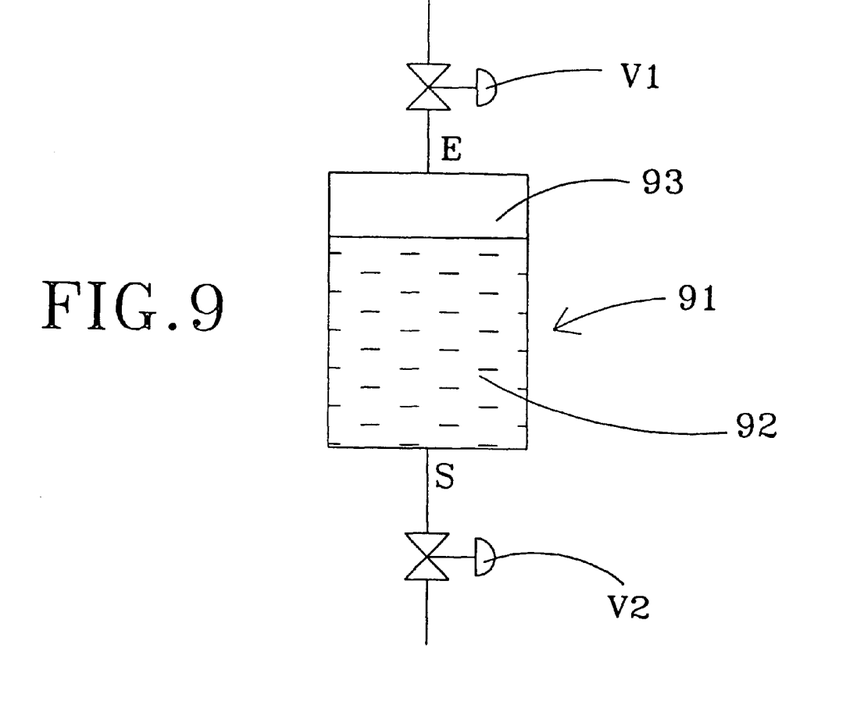
FIG. 9 shows a bleed container with two electrically operated valves, one in the inlet and the other in the outlet.
Figure 10:
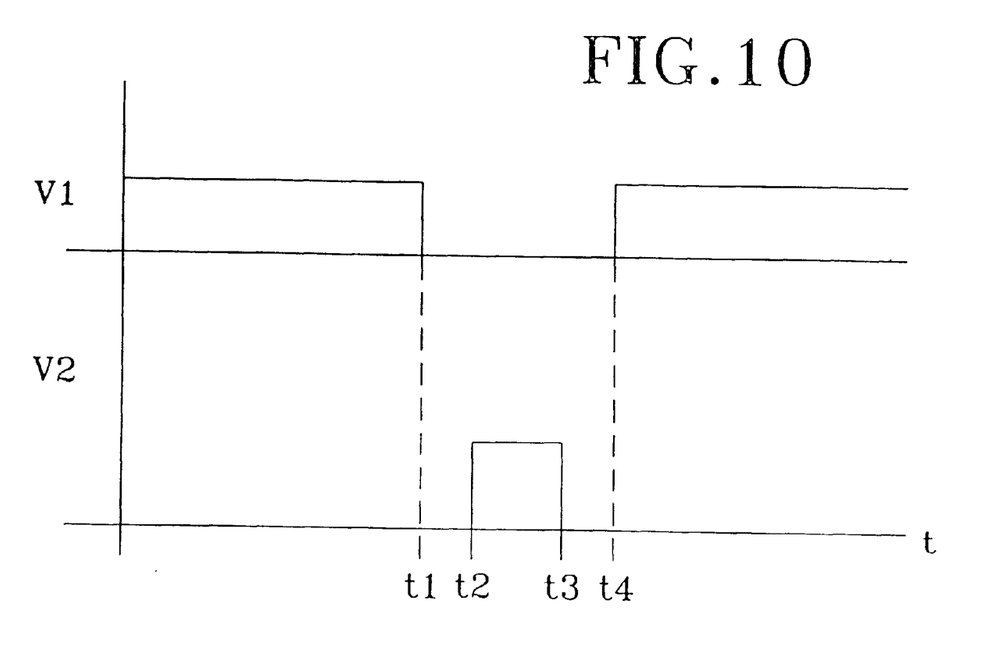
FIG. 10 shows the opening and closing cycles of the electrically operated valves of FIG. 9.

FIG. 9 shows a bleed container 91 with two electrically operated valves V1,V2, one at the input E and the other at the output S, while FIG. 10 shows the opening and closing cycles of the electrically operated valves V1 and V2 of FIG. 9.

In FIG. 9, the bleed container 91 contains a quantity of condensed liquid 92 and an air space 93.

As stated earlier, parametrization of the quantity of condensate produced, even if only approximately, means that the number of bleeding operations can be adjusted to objective factors, thereby avoiding the wastage of compressed air that occurs in regularly timed bleeding operations.

The bleeding container is of known capacity and the valves V1 and V2 are actuated in function of the accumulated volume of condensates.

Operation is as follows:

The inlet valve V1 is normally open, so that the condensate enters the container 91. When by calculation a certain percentage of the maximum capacity of the container 91 is reached, the inlet valve V1 (time t1) is closed. Once a certain time elapses (t21−t1, sufficient to ensure closure of said valve V1), the outlet valve V2 opens for a time (t21−t2). Given that the container was not totally filled with liquid 92, the pressure of the air-filled space 93 drives the condensate 92 outside. As the valve V1 is closed as condensate 92 goes out, no air can be lost from the circuit other than that corresponding to the space 93 not filled with condensate 92.

A great advantage is thereby obtained over timed systems, since the latter must be programmed for the times of maximum consumption (maximum condensate), and it is difficult to set the opening time. A large amount of air escapes from the circuit during low-consumption periods.

The suggested system only bleeds proportionally to consumption and, unlike the traditional system, does not bleed when there is no consumption or very low consumption. FIGS. 9 and 10 show a specific example in which the condensate is expelled with very little air loss. The time between bleeding operations is determined in function of one or more of the influencing factors, such as those which determine the quantity of humidity which has entered the circuit (volume entered, temperature, relative humidity and atmospheric pressure on aspiration from the compressor/s), and those which determine the quantity of condensation produced in the course of the treatment and use process (volume consumed and pressure and temperature of each stage).

What is claimed is:

1. Improvements in the regulation of fluid conditioning stations, which comprise a plurality of constant speed pumping devices, at least one fluid accumulator container, at least one pressured transducer and regulating means, the conditioning station providing a fluid at a certain pressure and flow for consumption, the pumping devices starting and stopping so that the pressure at a measuring point is maintained between two pressure-limit values called start pressure, which is determined in function of a limiting value to be maintained, and stop pressure, characterized in that when the pressure at the measuring point reaches or exceeds the start pressure value and/or when the flow provided by the pumping devices which are in operation is less than the consumption flow, the flow provided by the station increases by one step, and when the pressure at the measuring point reaches the stop pressure value and/or when the flow provided by the pumping devices which are in operation exceeds the consumption flow, the flow provided by the station reduces by one step, a "step" being taken to mean the flow of one pumping device of a station or the difference of flows between two sets of pumping devices of a station.

2. Improvements according to claim 1, characterized in that when one pumping device stops and another starts up in the sense of increasing the total capacity of the station, stoppage of the first does not take place until the set of pumping devices has reached or exceeded the start value by a certain percentage.

3. Improvements according to claim 1, characterized in that the pressure measuring point(s) are situated at the ends of the various consumption lines, taking the signal(s) from the most unfavourable measuring points or a combination of measuring points.

4. Improvements according to claim 1, characterized in that the pressure measuring points are at a point which is between the consumption points and the filters of the fluid conditioning station, taking the signal(s) from the most unfavourable measuring points or a combination thereof.

5. Improvements according to claim 1, characterized in that the stop value is not constant for all the pumping devices, it being possible for there to be as many stop values as there are steps making up the station, so that stoppage occurs for lower values than a conventional stop value which would be possible for all the pumping devices.

6. Improvements according to claim 1, characterized in that it consists in an additional hysteresis being provided for the critical points defined as the vacuum values reached (at constant consumption flow) after the start value is reached and a further step is entered, thereby avoiding the start/stop oscillations of pumping devices for very small variations in the consumption flow.

7. Improvements according to claim 1, characterized in that the hysteresis can be expressed in vacuum-measurement units, in flow units or as a percentage of any of the foregoing measurements.

8. Improvements in the regulation of fluid conditioning stations, which comprise a plurality of pumping devices, at least one fluid accumulator container, at least one pressure transducer and regulating means, the conditioning station providing a fluid at a certain pressure and flow for consumption, the pumping devices starting and stopping so that the pressure at the measuring point is maintained between two pressure-limit values called start pressure, which is determined in function of a limiting value to be maintained, and stop pressure, which is determined in function of the number of starts of the pumping devices per unit of time, characterized in that a pumping device stops or remains in operation without pumping ("stand by") when the aforesaid pumping device is in operating conditions which may give rise to a reduction in the life of the pumping device or lead to overheating of same.

9. Improvements according to claim 8, characterized in that the operating conditions which can give rise to a reduction of the life of the pumping device or overheating of same are defined in function of influencing factors such as the height above sea level, the power dissipated by the motor of the pumping device, ambient temperature, electrical overloads due to starts and the heat accumulation capacity of the pumping device.

10. Improvements according to claim 8, characterized in that in the non-pumping (stand by) mode of operation it is possible to work with lower stop values than those required for ON-OFF operation.

11. Improvements according to claim 8, characterized in that when the pressure at the measuring point reaches the stop pressure value, stoppage of the pumping device or operation thereof without pumping (stand by) only occurs if a preset time has elapsed, which is variable according to the influencing factors, since the last stoppage of the pumping device.

12. Improvements according to claim 8, characterized in that when the pressure at the measuring point reaches the stop pressure value, stoppage of the pumping device or operation thereof without pumping occurs only if a certain preset number of starts per unit of time has not been exceeded, the number of starts varying in accordance with the influencing factors.

13. Improvements according to claim 8, characterized in that when the pressure at the measuring point reaches the stop pressure value, stoppage of the pumping device or operation thereof without pumping occurs only if two conditions obtain: a preset time, variable in accordance with the influencing factors, has elapsed since the last stoppage of the pumping device; or if a certain preset number of starts per unit of time has not been exceeded, this being variable in accordance with the influencing factors, with one criterion or the other acting in function of a predetermined proportion between the number of starts to which the pumping device is subjected and a certain preset number of starts per unit of time.

14. Improvements according to claim 8, characterized in that when the pressure at the measuring point reaches the stop pressure value stoppage of the pumping device or its operation without pumping only takes place if the calculated value of the accumulated heat in the pumping device exceeds a preset value which varies in accordance with the influencing factors.

15. Improvements according to claim 8, characterized in that the reference value is taken to be the time taken to pass from the start value to the stop value or other value, calculating the cycle on the basis of calculation of the consumption flow, storage volumes, atmospheric pressure and flow of the operating pumps.

16. Improvements in the regulation of fluid conditioning stations, which comprise a plurality of pumping devices, at least one fluid accumulator container, at least one pressure transducer and regulating means, the conditioning station providing a fluid at a certain pressure and flow for consumption, characterized in that they consist in carrying out work on the station or on the installation (such as oil changes, draining and duration of an adsorption cycle) in proportion with influencing parameters of the station fluids (such as pressure, temperature and volume) at their various stages, and indraught influencing parameters (such as pressure, relative humidity and temperature).

17. Improvements according to claim 16, characterized in that the work at the station consists in carrying out a bleeding operation when the quantity of condensate is calculated to have reached the maximum amount planned, said maximum value being calculated on the basis of the influencing factors mentioned above.

18. Improvements according to claim 17, characterized in that there is a valve at the inlet to said container and a valve at the outlet from said container, said valves opening and closing in such a way that the two are never open at the same time.

19. Improvements as claimed in claim 16, characterized in that the action of the station consists in both the working time and the regeneration time of each tower being variable in accordance with one or more of the aforesaid influencing factors, such as on the one hand the ambient pressure (measured or estimated), the temperature (measured or estimated) and the ambient hygrometric degree (measured or estimated) and the flow circulating (measured or estimated), and on the other hand the internal influencing variables such as pressure (measured or estimated), temperature (measured or estimated) and hygrometric degree (measured or estimated).

\* \* \* \* \*

UNITED STATES PATENT AND TRADEMARK OFFICE
CERTIFICATE OF CORRECTION

PATENT NO. : 6,264,435 B1
DATED : July 24, 2001
INVENTOR(S) : Renedo Puig, Jordi et al.

Page 1 of 1

It is certified that error appears in the above-identified patent and that said Letters Patent is hereby corrected as shown below:

<u>Title page,</u>
Item [30], change "December 17, 1998" to -- December 17, 1997 --.

Signed and Sealed this

Fifth Day of March, 2002

Attest:

JAMES E. ROGAN
Attesting Officer
Director of the United States Patent and Trademark Office